March 24, 1970 W. C. SPRAGUE 3,501,938
DEVICE FOR STRAIGHTENING WRECKED VEHICLES
Filed Nov. 9, 1966 2 Sheets-Sheet 1
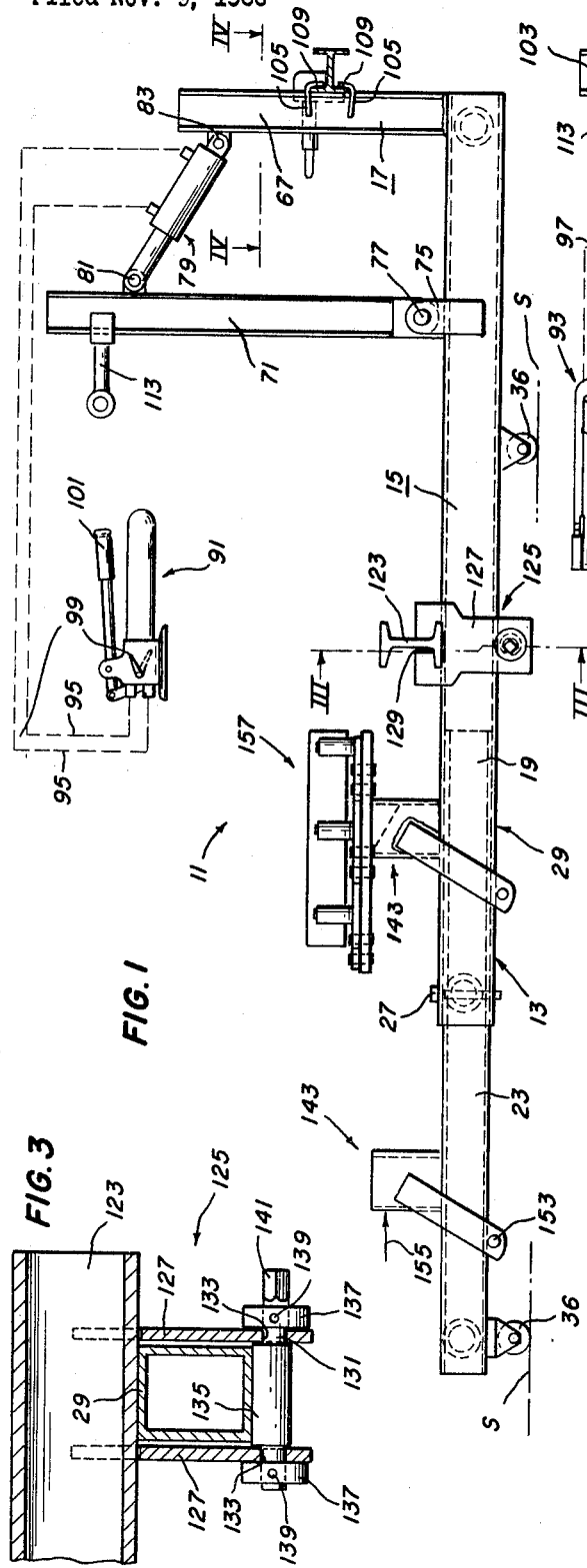
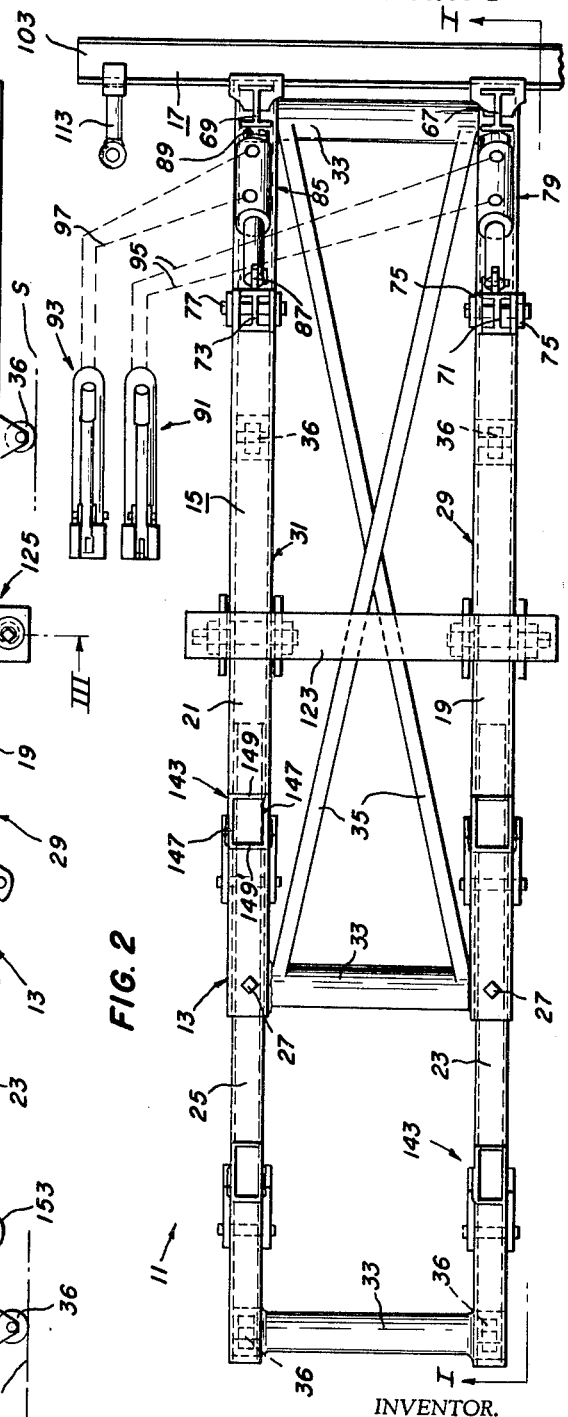
INVENTOR.
WESLEY C. SPRAGUE
BY John R. Walker, III
Attorney March 24, 1970   W. C. SPRAGUE   3,501,938
DEVICE FOR STRAIGHTENING WRECKED VEHICLES
Filed Nov. 9, 1966   2 Sheets-Sheet 2
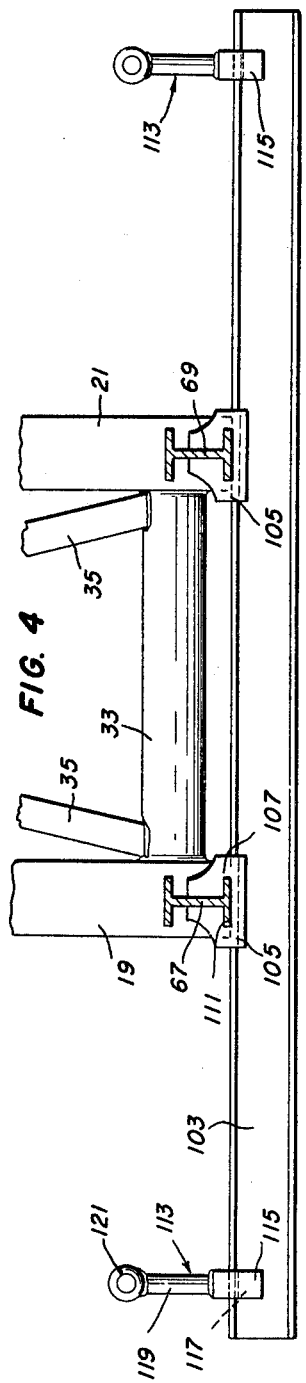
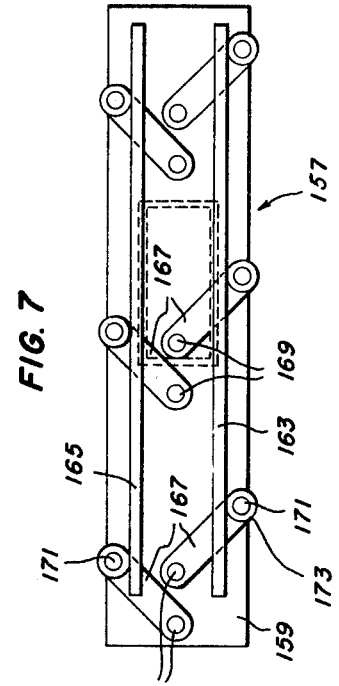
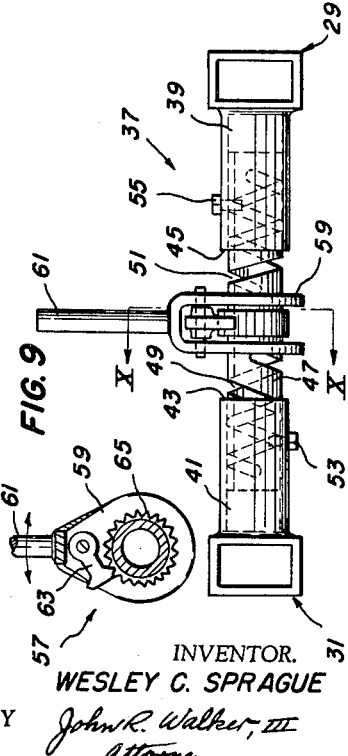
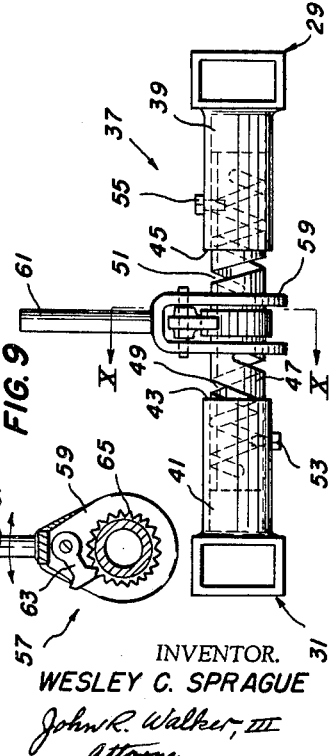
INVENTOR.
WESLEY C. SPRAGUE
BY John R. Walker, III
Attorney

United States Patent Office 3,501,938
Patented Mar. 24, 1970

3,501,938
DEVICE FOR STRAIGHTENING WRECKED
VEHICLES
Wesley C. Sprague, 990 Forrest Ave.,
Memphis, Tenn. 38105
Filed Nov. 9, 1966, Ser. No. 593,168
Int. Cl. B21d 1/12
U.S. Cl. 72—305
9 Claims

ABSTRACT OF THE DISCLOSURE

Automobile frame and body straightening apparatus having a broad generally rectangular base adapted to be arranged underneath a damaged automobile chassis and including anchor means for anchoring the substructure parts of the automobile to the broad base of the apparatus. The frame and body straightening apparatus including dual double-acting hydraulic piston-cylinder assemblies and individually operative dual push and pull pressure arms for exerting a push or pull or simultaneously operative tension or compression force on the damaged automobile parts. The apparatus also including a horizontal transverse bar adapted for vertical adjustment and including a plurality of attachment members horizontally adjustable along the vertically adjustable transverse bar. The attachment members providing horizontally and vertically adjustable anchor points for anchoring a mechanical winch or come-along type winch mechanism. The apparatus provides means for simultaneously applying both mechanical and hydraulic pressure simultaneously to several areas of the damaged automobile and provides means for returning the damaged parts to original positions with a minimum of bending, warping or crystallizing of the metal parts of the automobile. The apparatus also includes a cross member extending transversely across the broad rectangular base of the apparatus and includes adjustable anchor or engagement assemblies adapted for providing anchor points laterally or longitudinally of the automobile for anchoring the automobile or for providing anchor points for push or pull forces exerted on the damaged automobile parts in straightening the frame and body parts of the automobile.

This invention relates to apparatus for repair of vehicles, and more particularly to such apparatus for use in straightening auto frames, the bodies thereof, and other parts of the vehicle.

In previous apparatus of the above-mentioned type, there have been certain disadvantages. For example, in repairing autos that had extensive damage, it was generally necessary to set the apparatus up to repair one area of the damage, then move it to another area, etc. Also, the repair of twisted frames was a difficult and time-consuming job with previous apparatuses which had a single pivoted arm, since the apparatus itself had a tendency to turn or twist as the force was applied to the twisted frame. In addition, with so-called unitized bodies it was difficult to attach previous straightening apparatus to the frame portion of the unitized body.

The present invention is directed towards overcoming the above-mentioned and other disadvantages in previous vehicle straightening apparatus.

Thus, one of the objects of the present invention is to provide apparatus for straightening wrecked vehicles which is a single apparatus that can do the complete job of straightening a vehicle, as for example, portions of the apparatus can be utilized to hold certain parts of the vehicle while other portions of the apparatus can be utilized to hold or work on other parts of the vehicle.

A further object is to provide such apparatus which comprises a relatively wide frame on which are mounted two pivotable arms that can be attached to the vehicle, as for example, to twist the frame of the vehicle back into shape without twisting the apparatus.

A further object is to provide such apparatus that has a wide reach so that a pulling force can be exerted on the side of the auto, as for example, on the door while the base frame of the apparatus is inserted under the front or rear of the auto and braced therefrom.

A further object is to provide such apparatus that can be accommodated to any size vehicle.

A further object is to provide in such apparatus unique adjustable means for engaging underportions of the vehicle for the pull or push thereon.

A further object is to provide clamping means for clamping the frame portion of a vehicle and which clamps tighter as the pull is exerted thereon.

A further object is generally to improve the design and construction of apparatus for straightening wrecked vehicles.

The means by which the foregoing and other objects of the present invention are accomplished and the manner of their accomplishment will be readily understood from the following specification upon reference to the accompanying drawings, in which:

FIG. 1 is a somewhat schematic side view of the apparatus of the present invention, taken as on line I—I of FIG. 2.

FIG. 2 is a somewhat schematic top plan view thereof.

FIG. 3 is an enlarged sectional view taken as on the line III—III of FIG. 1.

FIG. 4 is an enlarged sectional view taken as on the line IV—IV of FIG. 1.

FIG. 5 is a portion of that shown in FIG. 1, on an enlarged scale.

FIG. 6 is a sectional view taken as on the line VI—VI of FIG. 5.

FIG. 7 is a top view of the clamping means of the present invention.

FIG. 8 is a side view of the clamping means shown resting on the block-like member (in broken lines).

FIG. 9 is a view of a modified arrangement of the frame in which the frame is adjustable in width.

FIG. 10 is a sectional view taken as on the line X—X of FIG. 9.

Referring now to the drawings in which the various parts are indicated by numerals, the apparatus 11 of the present invention includes a base frame 13 including a horizontal portion 15 and an upstanding portion 17 fixedly attached to the horizontal portion adjacent one end thereof. Horizontal portion 15 includes a pair of laterally spaced elongated outer beam members 19, 21 which are hollow, which are rectangular in cross section and which are open at the ends thereof. Horizontal portion 15 additionally includes a pair of laterally spaced elongated inner beam members 23, 25 which are preferably in the form of I-beams, and are respectively telescopically received in outer members 19, 21 for varying the length of base frame 13. A pair of pins 27 are removably received in apertures, not shown, in the outer beam members 19, 21 and in selected ones of apertures, not shown, in inner members 23, 25 to hold the inner beam members at a selected position relative to the outer members. From the foregoing, it will be understood that inner member 23 and outer member 19 establish the telescopic assembly 29, and inner member 25 and outer member 21 establish telescopic assembly 31 which is in spaced parallel relationship to telescopic assembly 29.

Suitable interconnecting means, as the pipes 33, are respectively interconnected between outer members 19, 21 and inner members 23, 25. Thus, as best seen in FIG. 2, a pipe 33 is fixedly connected adjacent the opposite ends thereof, as by welding or the like, to outer members 19, 21 at the forward ends thereof (end to the right as viewed in this figure). Another pipe 33 is fixedly connected adjacent the opposite ends thereof to outer members 19, 21 at the rearward ends of the outer members. Also, another pipe 33 is fixedly connected adjacent the opposite ends thereof to inner members 23, 25 at the rearward ends of the inner members. In addition, diagonal braces 35 are preferably fixedly attached at the opposite ends thereof to the pipes 33 attached to outer members 19, 21. A plurality of wheels 36 rollingly support base frame 13 from supporting surface S.

If desired, the base frame 13 may be constructed so as to be adjustable in width as well as in length. If so, the modified arrangement shown in FIGS. 9 and 10 can be substituted for one or more of the pipes 33. As will be seen by referring to FIGS. 9 and 10, the modified interconnecting assembly 37, which is shown interconnecting the telescopic assemblies 29, 31 includes a pair of pipe portions 39, 41 which are respectively fixedly attached adjacent the outer ends thereof to telescopic assemblies 29, 31 and the open ends 43, 45 thereof extend inwardly towards one another. A cylindrical inner member 47 having oppositely extending threads 49, 51 adjacent the ends thereof turnably extends into the pipe portion 39, 41. Pins 53, 55 mounted on the respective pipe portions 39, 41 extend into the interior of the pipe portions and slidably into the respective threads 49, 51. Suitable means is provided for turning inner member 47 in one direction or the other to move the pipe portions 39, 41 and thereby the telescopic assemblies 29, 31 inwardly or outwardly to vary the width of the frame. This turning means preferably includes a ratchet assembly 57 which includes a yoke 59 turnably mounted on inner member 47 adjacent the middle thereof and a handle 61 attached to yoke 59. In addition, a pawl 63 is pivotally mounted on yoke 59 to engage a ratchet wheel 65 fixedly mounted on inner member 47 to turn the inner member in the desired direction. It will be understood that if it is desired to make the base frame 13 adjustable in width, it is not necessary to substitute the interconnecting assemblies 37 for all of the pipes 33, but if desired, some of the pipes could be merely telescopically constructed.

Upstanding portion 17 of base frame 13 preferably includes a pair of upstanding standard members 67, 69 which are preferably in the form of I-beams that are fixedly attached adjacent the lower ends thereof respectively to outer members 19, 21 adjacent the front ends thereof and extend upwardly therefrom.

A pair of pivot arms 71, 73, which are preferably in the form of I-beams, are pivotally attached respectively adjacent the lower ends thereof to the outer members 19, 21 adjacent the front ends thereof and in spaced relationship to upstanding standard members 67, 69, as best seen in FIGS. 1 and 2. The means for pivotally attaching the arms 71, 73 as above-described, are by any suitable means, as the lugs 75 fixedly attached to the outer members 19, 21 and the pins 77 transversely extending through aligned apertures in the lugs 75 and the lower end of the arms 71, 73.

A double-acting piston-cylinder assembly 79 is pivotally attached by suitable means adjacent opposite ends as as 81 and 83 to arm 71 and upstanding member 67. Likewise, a double-acting piston-cylinder assembly 85 is pivotally attached to suitable means adjacent the opposite ends as at 87 and 89 to arm 73 and upstanding member 69. Suitable means as the pumps 91, 83, of well-known construction, are provided for respectively actuating the piston-cylinder assemblies 79, 85 to extend and retract the assemblies and thereby to swing arms 71, 73 forwardly and rearwardly, either together or independently as desired. The pumps 91, 93 are fluid or hydraulic pumps of well-known construction and are connected respectively to the piston-cylinder assembly 79, 85 through suitable conduits which are shown diagrammatically as at 95 and 97. It will be understood that by moving the lever 99 on pump 91 into the dotted line position shown in FIG. 1 that the hydraulic fluid will flow through the conduits 95 in such a manner that the piston-cylinder assembly 79 will be either extended or retracted when the handle 101 of the pump 91 is actuated, and that the actuation of the handle 101 with the lever 99 in the solid line position will cause the hydraulic fluid to flow in the opposite direction in the conduits to cause the opposite movement of piston-cylinder assembly 79. The other pump 93 operates in a similar manner.

A transverse beam 103, which is preferably in the form of an I-beam, is adjustably mounted on upstanding members 67, 69 and preferably extends laterally outwardly for a substantial distance on either side of the upstanding members. The means for adjustably mounting transverse beam 103 as above-described are preferably in the form of clips 105. Each of the clips 105 includes a horizontal base portion 107 and a flange 109 projecting at right angles from the base portion 107 along an edge thereof. A substantially T-shaped slot 111 is provided in base portion 107 and adapted to closely slidably fit over one flange and part of the web of the upstanding member 67 or 69 with the flange 109 extending over one of the flanges of the transverse beam 103, as best seen in FIGS. 1, 2 and 4. The clips 105 are in pairs, that is, an upper one in which the flange 109 extends downwardly and a lower one in which the flange extends upwardly, as best seen in FIG. 1. It will be understood that the weight of the beam 103 on the lower one of clips 105 causes it to slightly cant and dig into the flange of the upstanding members 67 or 69 so that it will not slide on the upstanding members 67 or 69 so that it will not slide on the upstanding member but will hold the beam in place. Then, when the weight of the transverse beam 103 is taken off the clip as by manually lifting the beam, the clip 105 can be moved to another location for varying the height of the transverse beam. It will be understood that the upper one of the clips 105 primarily holds the transverse beam inwardly against the upstanding members 67 or 69 to prevent twisting thereof. Attachment members 113 are provided for adjustable attachment of chains, jacks or the like selectively either to arms 71, 73 or transverse beam 103. Each of the attachment members 113 is provided with a base portion 115 which has a T-slot 117 therein similar to the T-slot 111 and adapted to engage one of the flanges and a portion of the web of the arms 71, 73 or transverse beam 103. In addition, each of the attachment members 113 includes a projection 119 fixedly attached to base portion 115 and extending outwardly therefrom where on the outer end thereof a ring 121 is fixedly attached to projection 119. The attachment members 113 are for the purpose of providing an anchor place for the end of the usual attachment means that is hooked onto the wrecked portion of the automobile for the straightening thereof, as for example, chains, jacks, and the like.

A cross member 123, which is preferably in the form of an I-beam, extends across the tops of telescopic assemblies 29, 31 and is movably attached thereto by the respective attachment assemblies 125. Each attachment assembly 125 includes a pair of side plates 127. Each of side plates 127 is provided with an inverted T-shaped slot 129 in the upper edge thereof which slidably fits the lower flange and a portion of the web of the cross member 123, as best seen in FIG. 1. A shaft 131 extends below the corresponding telescopic assembly 29 or 31 and turnably through aligned apertures 133 in side plates 127. Between the side plates 127 shafts 131 is provided with an eccentric portion 135 and on shaft 131 on the outside of side plates 127 are provided the annular members 137 which are removably held on the shaft as by suitable fastening means as the set screws 139. At the end of shaft 131 is provided a portion 141 that is square in cross section so that shaft 131 can be turned to wedge the eccentric portion 135 against the bottom of the corresponding telescopic assembly 29 or 31, as best seen in FIG. 3, whereupon the cross member 123 is tightly clamped in place by means of the side plates 127, or the shaft can be turned to release the eccentric portion 135 from the telescopic assembly so that the cross member 123 can be moved to another location or can be removed, if desired.

Engagement means or engagement assemblies 143 are provided on telescopic assemblies 29, 31 and if desired, on cross member 123 for engaging the underportions of the vehicle to be straightened. Each of the engagement assemblies 143 includes a substantially block-like member 145 which is open at the upper end thereof and includes parallel spaced walls 147 integrally interconnected by the parallel spaced forward and rearward end walls 149, 149', respectively. The block-like member 145 is adapted to rest on telescopic assemblies 29 or 31 in the manner best seen in FIGS. 1, 2 and 5. The engagement assemblies 143 additionally include a pair of depending members 151 respectively fixedly attached to block-like member 145, as by welding or the like, on the opposite sides of the block-like member. Depending members 151 angle downwardly from block-like member 145 alongside of and below the corresponding telescopic assembly 29 or 31. A pin 153 extends through aligned apertures in depending members 151 and below the telescopic members, as best seen in FIG. 6 to slidably mount the engagement assembly 143 on the telescopic member. In addition, pin 153 engages the bottom of the corresponding telescopic assembly 29 or 31 to prevent tilt of the block-like member 145 when in engagement with the underportion of the vehicle when forces are applied thereto. Thus, for example, if a relative force were exerted against the forward end wall 147' of block-like member 145 in a direction shown by the arrow as at 155 in FIG. 1, the tendency to tilt or rotate the block-like member clockwise as viewed in this figure would be prevented by the simultaneous engagement of the pin 153 on the bottom of the telescopic member 29 and bottom edge 153' of member 145 on the top of member 29. It will be understood that such a force as force 155 will be exerted when the underportions of the vehicle, not shown, are being pulled to the right as viewed in FIG. 1, as for example, when the arms 71, 73 are pulling the front of the vehicle to the right. It will be understood that if a pushing force is exerted on the vehicle, that the force 155 will be in the other direction and it will be necessary for the engagement assembly 143 to be turned around 180° from the position shown in FIG. 1. Although four of such assemblies 143 are shown in FIGS. 1 and 2, it will be understood that normally the engagement means or assemblies are used in pairs, that is, either a pair on inner members 23, 25 or a pair on outer members 19, 21.

Clamping means or clamping assemblies 157 (only one of which is shown) are adapted to be respectively removably fitted on block-like members 145, as shown in FIGS. 1, 7 and 8. Each of clamping assemblies 157 includes a horizontal plate portion 159 resting on the upper edge of block-like member 145. A stop means or plate 161, which is preferably in the form of the triangular plate best seen in FIG. 8, is fixedly attached to the bottom of plate portion 159 and extends downwardly into block-like member 145 to prevent the clamping assembly 157 from moving relative to the block-like assembly 145 when forces are exerted on the clamping assembly, tending to move the clamping assembly forwardly or to the right as viewed in FIGS. 1, 7 and 8. Clamping assembly 157 includes a pair of spaced parallel vertical plates 163, 165 that extend fore and aft relative to plate portion 159 and relative to the base frame 13. Means are provided for swingably mounting vertical plates 163, 165 for swinging movement towards and away from one another while remaining parallel. In other words, the plates 163, 165 are so mounted that the plates swing inwardly towards one another responsive to a force being exerted on the plates in a direction parallel to the plates and towards one end of the horizontal plate portion, that is, towards the right or front end as viewed in FIGS. 1, 7 and 8. The means for mounting the vertical plates 163, 165, as above-described, preferably comprise a plurality of links 167 which are pivotally mounted from plate portion 159 for pivot about vertical axes as by means of the pins 169 and which are pivotally mounted adjacent the opposite ends to the respective vertical plates 163, 165, as by means of the upstanding pins 171 fixedly attached to the outer ends of links 167 and which rotatably extend through sleeves 173 that are in turn fixedly attached on the back sides of the respective vertical plates. Clamping assemblies 157 are particularly useful for clamping the frame portions of a so-called unitized body. Thus, the clamping assembly 157 is so placed relative to the frame portion of the vehicle that vertical plates 163, 165 are in abutment with the opposite sides of the frame portion. Then, when the frame portion is moved to the right as viewed in FIGS. 1, 7 and 8, as by the vehicle being pulled forwardly, then the vertical plates 163, 165 will move inwardly and be more firmly clamped to the frame portion as more pull is exerted. It will be understood that the component of force to the right of the vehicle frame portion on the vertical plates 163, 165 will depend upon the frictional engagement between the vertical plates and the frame portion. Thus, the inner sides of vertical plates 163, 165 are preferably roughened, serrated, or the like. Also, it will be understood that if there is a pushing force on the vehicle, rather than a pulling one, heretofore-described, the clamping assembly 157 should be turned around 80° from the position shown in FIGS. 1, 7 and 8.

From the foregoing description, it will be understood that a very efficient apparatus is provided in which many different straightening jobs can be accomplished on a vehicle and all at the same time. Also, such an apparatus is provided which is particularly useful in straightening twisted frames in vehicles. Thus, for example, such frame straightening can be accomplished by rolling the apparatus 11 into position relative to the vehicle so that the horizontal portion 15 extends under the vehicle from the front thereof. Then, the arms 71, 73 can be attached to the respective frame members so that one of the arms can be pulling while the other is pushing to twist the frame back into shape. In addition, it will be understood that due to the wide reach of the apparatus 11, particularly with the use of the transverse beam 103, the apparatus can be used to pull from the sides of the automobile, as for example, to straighten the doors thereof while other portions of the apparatus are being used to straighten other portions of the vehicle. In addition, it will be understood that the present invention is very versatile and can be adapted to any size of vehicle.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. Apparatus for straightening wrecked vehicles comprising a base frame including a horizontal parallel spaced pair of beam means and an upstanding parallel spaced pair of standard members fixedly attached respectively to said pair of beam means adjacent the forward end portions thereof, means interconnecting said pair of beam means in horizontally parallel spaced relationship, a pair of arms, pivot means independently pivotally attaching said arms to said horizontal beam means in laterally spaced relationship to each other and rearwardly respectively of said upstanding standard members, a pair of double-acting piston cylinder means operatively interposed respectively between said pair of arms and said pair of upstanding standard members for pivot of said arms towards and away from said standard members, a pair of hydraulic pump means selectively operable for extending or contracting respectively said pair of double-acting cylinder assemblies, and engagement means mounted on at least one of said horizontal beam means for engaging substructure portions of the vehicle to be straightened.

2. The apparatus of claim 1 in which said horizontal parallel pair of beam means each includes a pair of laterally spaced elongated outer beam members, a pair of laterally spaced elongated inner beam members telescopically received in said outer beam members for varying the length of said base frame, and wherein said interconnecting means includes manually adjustable means for varying the width of said base frame and for selectively adjusting the parallel spacing of said pair of beam means.

3. The apparatus of claim 2 in which is included a transverse beam and clip means adjustably horizontally mounting said transverse beam on said upstanding standard members for selective vertical positioning of said transverse beam relative to said upstanding standard members.

4. The apparatus of claim 3 wherein said transverse beam is of I section configuration and in which is included at least one attachment member having a T-slotted portion longitudinally slidably mounted on said transverse beam.

5. The apparatus of claim 1 in which said horizontal pair of beam means each includes a beam member, and in which said engagement means includes at least one engagement assembly including a substantially tall block-like member endwise supported perpendicularly on the upper surface of said beam member, a pair of depending members fixedly attached to said block-like member on opposite sides thereof angling downwardly therefrom on opposite sides of said beam member and extending therebelow, and removable pin means interconnecting said depending members and subjacently spanning and in frictional engagement with the bottom surface of said beam member, said block-like member including a generally planar vertical forward end wall arranged in a plane lying transverse said beam member, and facing toward a vertical plane lying coincident with the axis of said pin means, the upper distal end portion of said block-like member remote from the upper surface of said beam member defining support structure adapted for receiving horizontal thrust in a direction parallel the longitudinal extension of said beam member and such thrust force exerted on the outer surface of said forward wall of said block-like member.

6. The apparatus of claim 5 which includes a cross member extending transversely across the beam members of said pair of beam means, and means adjustably mounting said cross member on said beam members for longitudinal and transverse adjustment of said cross member relative to said pair of beam means.

7. The apparatus of claim 5 in which is included clamping means mounted on the upper distal end portion of said block-like member for clamping the underportions of a vehicle.

8. The apparatus of claim 7 in which said clamping means includes an elongated horizontal plate supported on the upper distal portion of said block-like member, means interacting between said plate portion and said block-like member for holding said horizontal plate stationary relative to said block-like member, a pair of elongated horizontally extending spaced parallel vertical plates arranged respectively lengthwise correspondingly and on opposite sides of the upper surface of said horizontal plate, means swingably mounting said vertical plates in parallel relationship for converging diverging movement towards or away from one another responsive to forces being exerted on said vertical plates in directions parallel to said vertical plates and towards opposite ends of said horizontal plate and whereby relative movement of a portion of a vehicle frame structure clamped between said vertical plates towards one end of said horizontal plate portion is effective for causing said pair of vertical plates to converge in progressive clamping action on said frame structure.

9. Apparatus for straightening wrecked vehicles comprising a base frame including a pair of parallel spaced and horizontally extending telescopic assemblies and a pair of laterally spaced upstanding members respectively fixedly attached to said telescopic assemblies adjacent one of the ends thereof, a pair of arms, a pair of means independently pivotally attaching said arms to said telescopic assemblies, a pair of piston-cylinder assemblies respectively interacting between said arms and said upstanding members for pivot of said arms towards and away from said upstanding members, at least one block-like member slidably resting on one of said telescopic assemblies, a pair of depending members fixedly attached to said block-like member on opposite sides thereof and angling downwardly therefrom on opposite sides of said one of said telescopic assemblies and extending therebelow, and removable fastening means interconnecting said depending members below said one of said telescopic assemblies and in engagement with said one of said telescopic assemblies on the bottom thereof to prevent tilt of said block-like member.

References Cited

UNITED STATES PATENTS

| | | | |
|---|---|---|---|
| 2,634,788 | 4/1953 | Harteker et al. | 72—705 X |
| 2,742,945 | 4/1956 | Jacobsen | 72—705 X |
| 2,845,983 | 8/1958 | Hanson | 72—300 |
| 2,901,022 | 8/1959 | Wilkerson | 72—705 X |
| 3,015,353 | 1/1962 | Brown | 72—302 |
| 3,029,859 | 4/1962 | Grant | 72—705 |
| 3,053,305 | 9/1962 | Lincourt | 72—705 X |
| 3,108,629 | 10/1963 | Jenkins | 72—705 X |
| 3,131,748 | 5/1964 | Junkins | 72—705 X |
| 3,149,660 | 9/1964 | Smith | 72—293 |
| 3,276,237 | 10/1966 | Transue | 72—705 X |

FOREIGN PATENTS

| | | |
|---|---|---|
| 119,363 | 1/1945 | Australia. |

OTHER REFERENCES

Padgett-Puller by O'Neal (4 pages) rec'd. Dec. 5, 1961.

LOWELL A. LARSON, Primary Examiner

U.S. Cl. X.R.

72—705